United States Patent

Ishikawa et al.

Patent Number: 6,141,472
Date of Patent: Oct. 31, 2000

[54] OPTICAL CABLE AND OPTICAL CABLE CHAMBER ELEMENT

[75] Inventors: Hiroki Ishikawa; Yoshiyuki Suetsugu; Shigeru Tanaka, all of Yokohama; Hideyuki Iwata, Mito; Toku Ishii; Ryouzo Nishikawa, both of Gifi, all of Japan

[73] Assignees: Sumitomo Electric Industries, Ltd., Osaka; Nippon Telegraph and Telephone Corporation, Tokyo; Ube-Nitto Kasei Co., Ltd., Tokyo, all of Japan

[21] Appl. No.: 09/115,836

[22] Filed: Jul. 15, 1998

[30] Foreign Application Priority Data

Jul. 15, 1997 [JP] Japan .................................. 9-189879

[51] Int. Cl.$^7$ ...................................................... G02B 6/44
[52] U.S. Cl. ............................ 385/105; 385/104; 385/114
[58] Field of Search .................................. 385/103, 104, 385/105, 110, 111, 112, 113, 114

[56] References Cited

U.S. PATENT DOCUMENTS

| | | | |
|---|---|---|---|
| 5,542,019 | 7/1996 | Pascher | 385/105 |
| 5,651,082 | 7/1997 | Eoll | 385/114 |
| 5,671,313 | 9/1997 | Schneider et al. | 385/110 |
| 5,920,672 | 7/1999 | White | 385/110 |

FOREIGN PATENT DOCUMENTS

| | | |
|---|---|---|
| 55-45087 | 3/1980 | Japan . |
| 61-72212 | 4/1986 | Japan . |
| 4-182611 | 6/1992 | Japan . |
| 2538333 | 3/1997 | Japan . |

*Primary Examiner*—Jon Henry
*Attorney, Agent, or Firm*—Pillsbury, Madison & Sutro LLP

[57] ABSTRACT

An optical cable has a plurality of optical fibers. The optical fibers are contained in fiber containing cavities of chamber elements. Each chamber element has a bottom part and a pair of side wall parts, which defines a fiber containing cavity. The individual chamber elements containing the optical fibers are assembled around a thickening layer in an S-Z strand. Each side wall part is formed such that its thickness gradually decreases from its base end portion toward free end portion. Also, the thickness of the bottom part is greater than the thickness of each side wall part.

6 Claims, 7 Drawing Sheets

OPTICAL CABLE AND OPTICAL CABLE CHAMBER ELEMENT

BACKGROUND OF THE INVENTION

1. Field of the Invention

The present invention relates to an optical cable laid in the underground, on the ground, in the air, or on the sea bottom; and a chamber element utilized when optical fibers are mounted in the optical cable.

2. Related Background Art

Conventionally known as a technique in such a field is that disclosed in Japanese Patent Application Laid-Open No. 55-45087. The optical cable disclosed in this publication comprises a plurality of chamber elements made of a plastic each provided with a fiber containing cavity for containing a coated optical fiber, a loose tube, a ribbon fiber, or the like (hereinafter simply referred to as "optical fiber" in general terms); and a tension member functioning as a central member. The individual chamber elements containing optical fibers are assembled around the central member in the state where their bottom faces are in contact with the central member. Each chamber element has a bottom part and a pair of side wall part parts rising from both ends of the bottom part. Namely, the chamber element has substantially a U-shaped cross section. The chamber element is extrusion-molded as a straight elongated member. It is considered preferable that the bottom part and side wall parts of the chamber element each have a thickness of 0.5 mm or greater.

Also, Japanese Patent Application Laid-Open No. 4-182611 discloses an optical cable in which a plurality of chamber elements each having substantially a U-shaped cross section and containing an optical fiber therein are assembled in an S-Z strand around a central member. In this case, as shown in FIG. 6, in order for fiber containing cavities 102 to face outward, chamber elements 100 are assembled around the central member 110 in the state where their bottom faces are in contact with the central member 110. Accordingly, in the S-Z locus formed by each chamber element 100, at each position Re (hereinafter referred to as "S-Z reverse portion"; see FIG. 7) where S strand turns into Z strand or vice versa, it is necessary to bend the chamber element 100 in the widthwise direction x of its fiber containing cavity 102 as shown in FIG. 8.

The conventional optical cables and the chamber elements therefor, however, have the following problems. Namely, in the conventional chamber elements, each of the bottom part and side wall part parts has been formed with a uniform thickness. Also, the thickness of the bottom part and that of each side wall part have been equal to each other. Accordingly, when a chamber element is forcibly bent in the widthwise direction x of the fiber containing cavity in order to form the S-Z reverse portion Re, its inner side wall part 101a (on the curvature center side) leans outward (toward the fiber containing cavity 102) as shown in FIGS. 9 and 10. On the other hand, the outer side wall part 101b leans inward (toward the fiber containing cavity 102). Consequently, thus leaning side wall parts 101a, 101b may collide with a ribbon fiber stack 103 contained in the fiber containing cavity 102, thus applying a lateral pressure to the ribbon fiber stack 103 (see FIG. 10). As a result, transmission loss in each ribbon fiber 104 of the ribbon fiber stack 103 may increase.

Also, when both side wall parts 101a, 101b lean toward the fiber containing cavity 102 and come close to each other, the opening of the fiber containing cavity may be blocked by the side wall part parts 101 as shown in FIG. 10. Consequently, in the case where, after the optical cable is laid, the ribbon fibers 104 are to be taken out from the optical cable so as to branch out, it becomes difficult to take out the ribbon fibers 104 from within the chamber elements 100, thus lowering workability.

SUMMARY OF THE INVENTION

In order to overcome the above-mentioned problems, it is an object of the present invention to provide an optical cable excellent in transmission characteristics and easiness of taking out optical fibers therefrom, and an optical fiber chamber element applicable to this optical cable.

The optical cable in accordance with the present invention is an optical cable having a plurality of optical fibers. This optical cable comprises a central member and a plurality of chamber elements each having a fiber containing cavity. Also, the optical cable has an S-Z stranded part in which the individual chamber elements containing optical fibers are assembled around the central member in an S-Z strand. Each chamber element has a bottom part and a pair of side wall parts rising from both ends of the bottom part. The fiber containing cavity for containing an optical fiber is defined by the bottom part and the pair of side wall parts. Each side wall part is formed such that its thickness gradually decreases from its base end portion toward free end portion.

When assembling chamber elements around a central member in an S-Z strand, it is necessary to forcibly bend each chamber element in the widthwise direction at S-Z reverse portions of the S-Z locus formed by this chamber element. When the chamber element is forcibly bent in the widthwise direction of the fiber containing cavity, however, both side wall parts of the chamber element lean toward the fiber containing cavity. Here, when the chamber element is bent, the radius of curvature of its inner side wall part (on the curvature center side) would differ from that of the outer side wall part. On the other hand, both side wall parts inherently have the same length. Hence, when the chamber element is bent, both side wall parts thereof tend to maintain their inherent lengths against the tensile force acting along the circumferential direction. As a result, the side wall parts may lean.

Namely, the state where a chamber element is bent in the widthwise direction of its fiber containing cavity is equivalent to the case where a stress acts on each side wall part (the free end portion of the side wall part in particular) from the outside. In this case, the magnitude of stress acting on the side wall part is proportional to the magnitude of distortion energy accumulated in the chamber element when the chamber element (side wall part) is bent in the widthwise direction. On the other hand, the magnitude of moment for leaning each side wall part toward the fiber containing cavity using its base end portion as a fulcrum is proportional to the product obtained by multiplying the distance from the base end portion to free end portion of the side wall part by the magnitude of stress applied to the side wall part. Therefore, in the present invention, the side wall parts of the chamber element used for an optical cable are formed such that their thickness gradually decreases from the base end portion toward the free end portion.

Since the moment generated in each side wall part decreases as a consequence, both side wall parts would lean less toward the fiber containing cavity when the chamber element is bent in the widthwise direction of the fiber containing cavity. Accordingly, an optical cable using such a chamber element can favorably maintain transmission characteristics of optical fibers included therein. Also, the opening portion of the fiber containing cavity is prevented from being blocked by both side wall parts. As a consequence, after the optical cable is laid, optical fibers can easily be taken out therefrom so as to branch out. Further, it is not necessary for the chamber element to have a form greatly changed from that of the conventional one.

In this case, very good results in practice can be obtained when, assuming that the thickness of the free end portion to be $T_{sf}$, and the thickness of the base end portion to be $T_{sb}$, $T_{sf} \leq 0.85 \times T_{sb}$ is satisfied. More preferably, $T_{sf} \leq 0.75 \times T_{sb}$ is satisfied.

Another optical cable in accordance with the present invention is an optical cable having a plurality of optical fibers. This optical cable comprises a central member and a plurality of chamber elements each having a fiber containing cavity. Also, the optical cable has an S-Z stranded part in which the individual chamber elements containing optical fibers are assembled around the central member in an S-Z strand. Each chamber element has a bottom part and a pair of side wall parts rising from both ends of the bottom part. The fiber containing cavity for containing an optical fiber is defined by the bottom part and the pair of side wall parts. The bottom part has a thickness greater than that of each side wall part.

The inventors have elucidated that the side wall parts of a chamber element may lean due to the bending of the bottom part as well. Therefore, when determining the thickness of the bottom part, the inventors have taken account of the relationship between the thickness of the bottom part and the thickness of each side wall part. As a result of various experiments, it has been found out that the bending in the bottom part can be kept to a minimum when the thickness of the bottom part is made greater than the thickness of the side wall part.

In this case, very good results in practice can be obtained when, assuming the thickness of the bottom part to be $T_b$, and the thickness of the side wall part to be $T_s$, $T_b \geq 1.1 \times T_s$ is satisfied. More preferably, $T_b \geq 1.2 \times T_s$ is satisfied.

The optical cable chamber element in accordance with the present invention is adapted to be stranded around a central member of an optical cable. The optical cable chamber element has a bottom part and a pair of side wall parts rising from both ends of the bottom part. The fiber containing cavity for containing an optical fiber is defined by the bottom part and the pair of side wall parts. Each side wall part is formed such that its thickness gradually decreases from its base end portion toward free end portion. In this case, very good results in practice can be obtained when, assuming that the thickness of the free end portion to be $T_{sf}$, and the thickness of the base end portion to be $T_{sb}$, $T_{sf} \leq 0.85 \times T_{sb}$ is satisfied. More preferably, $T_{sf} \leq 0.75 \times T_{sb}$ is satisfied.

Another optical cable chamber element in accordance with the present invention is adapted to be stranded around a central member of an optical cable. The optical cable chamber element has a bottom part and a pair of side wall parts rising from both ends of the bottom part. The fiber containing cavity for containing an optical fiber is defined by the bottom part and the pair of side wall parts. The bottom part has a thickness greater than that of each side wall part. In this case, very good results in practice can be obtained when, assuming the thickness of the bottom part to be $T_b$, and the thickness of the side wall part to be $T_s$, $T_b \geq 1.1 \times T_s$ is satisfied. More preferably, $T_b \geq 1.2 \times T_s$ is satisfied.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, preferred embodiments of the optical cable chamber element and optical cable in accordance with the present invention will be explained in detail with reference to the accompanying drawings.

Figure 1:
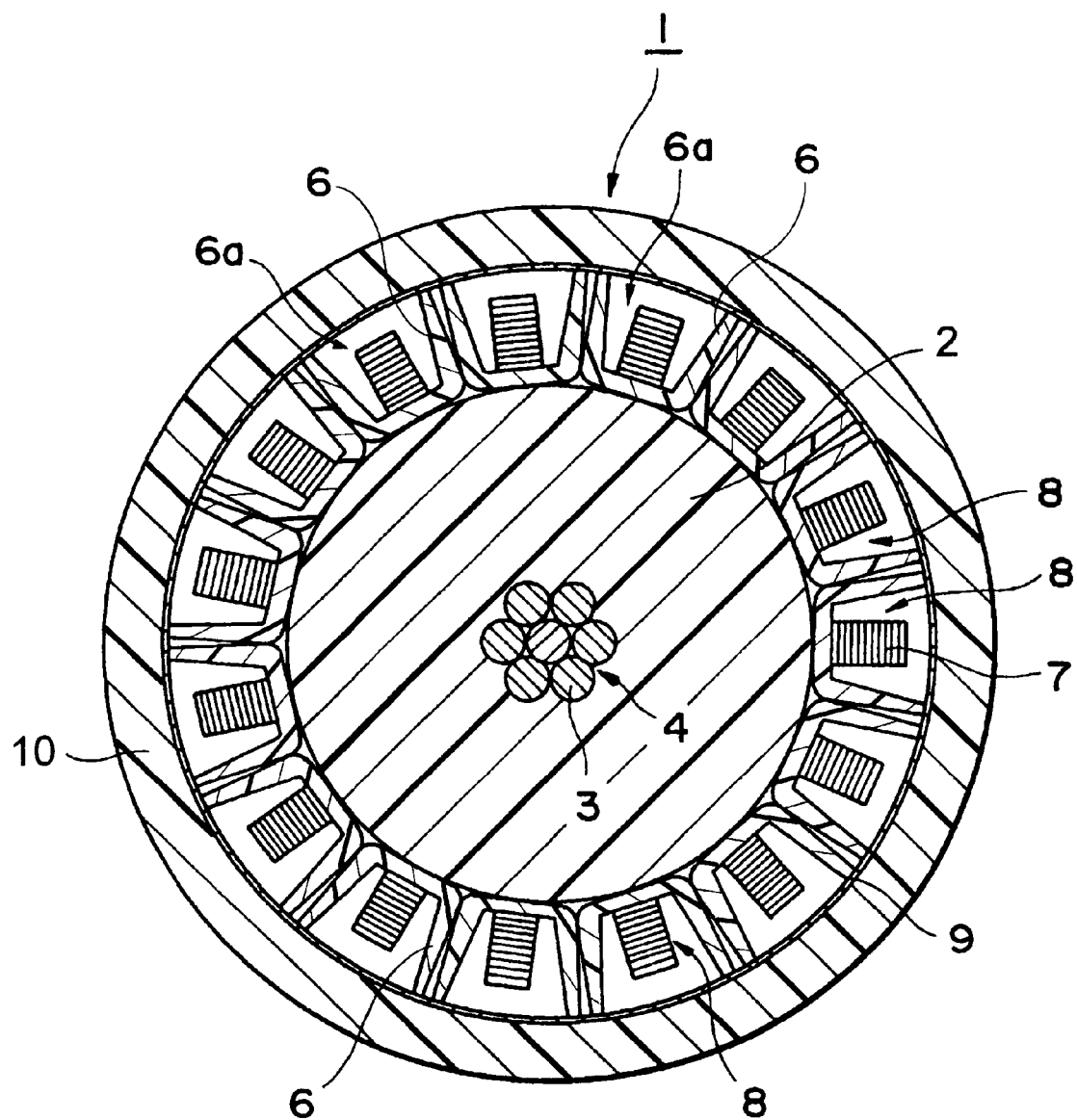
FIG. 1 is a sectional view showing an optical cable in accordance with the present invention.
Figure 2:
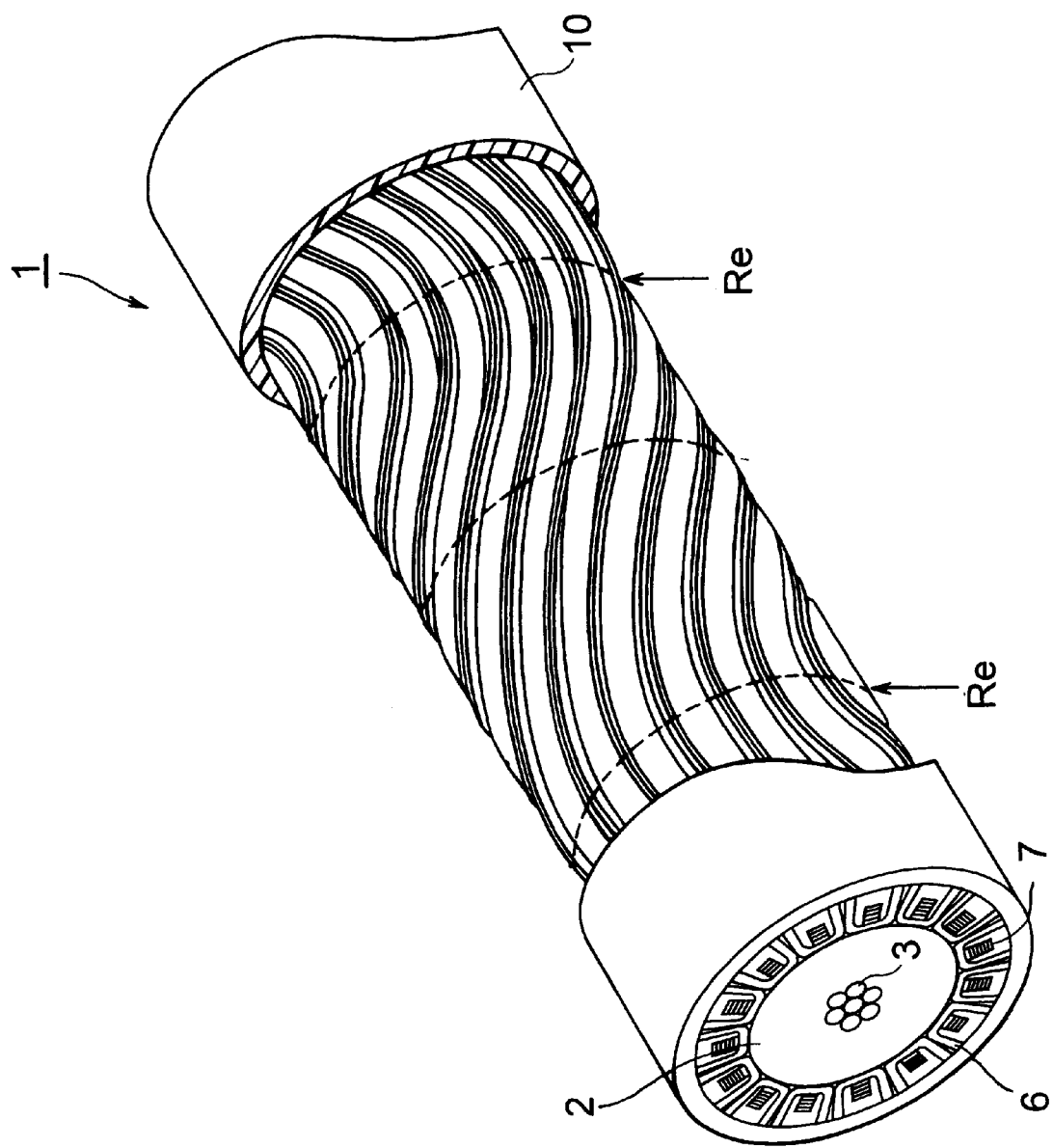
FIG. 2 is a perspective view showing the optical cable of FIG. 1.

FIG. 1 is a sectional view of an optical cable in accordance with the present invention. On the other hand, FIG. 2 is a perspective view showing the optical cable in accordance with the present invention. As shown in FIG. 1, disposed at the center of the optical cable 1 is an elongated thickening layer 2 (central tension member) functioning as a central member. The thickening layer 2 is formed from high-density polyethylene. Disposed within thethickening layer 2 at its center is a tension member 4 in which 7 steel wires 3 are stranded together. As shown in FIG. 2, 15 pieces of elongated chamber elements 6 are assembled around the thickening layer 2 in an S-Z strand. Each chamber element 6 is formed with substantially a U-shaped cross section and has a fiber containing cavity 6a.

In the state where the opening portion of each fiber containing cavity 6a faces outward, the individual chamber elements 6 are assembled around the thickening layer 2. Contained within each fiber containing cavity 6a is a ribbon fiber stack 8 in which 10 ribbon fibers 7 (optical fibers) are superposed on one another and bundled together. A holding tape 9 is tightly wound around the chamber elements 6. Thus securely maintained is the state where the individual chamber elements 6 are assembled around the thickening layer 2 in an S-Z strand. Disposed around the holding tape 9 is an outside cladding 10 made of polyethylene. The outside cladding 10 protects the inner members of the optical cable 1.

Figure 3:
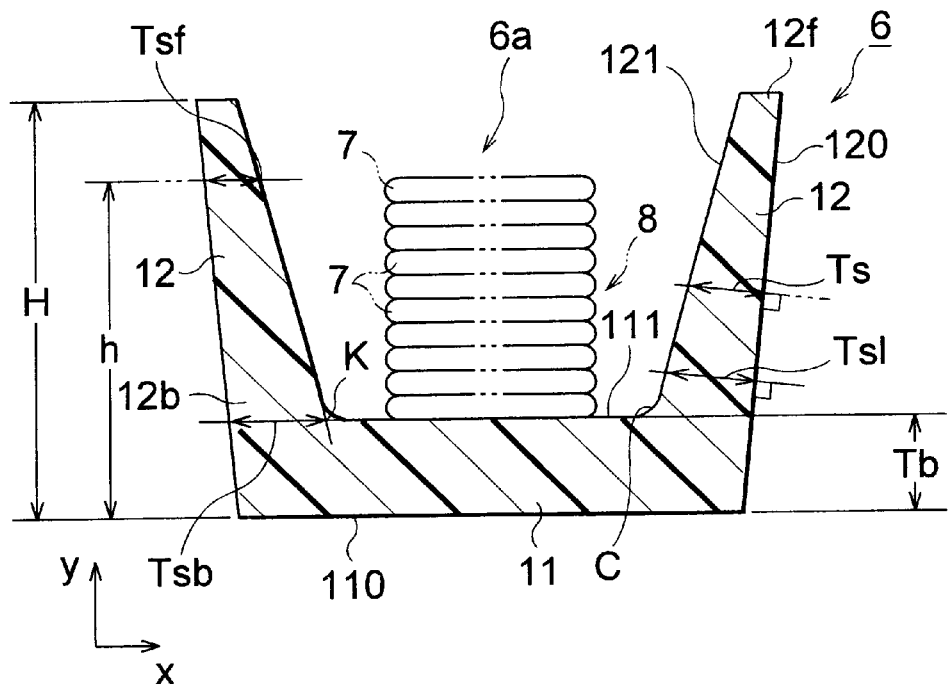
FIG. 3 is a sectional view showing a first embodiment of the optical cable chamber element in accordance with the present invention.

Each chamber element 6 is made, as shown in FIG. 3, by extrusion-molding a synthetic resin such as PBT or the like, for example. The chamber element 6 has a bottom part 11 and a pair of right and left side wall parts 12 rising from both ends of the bottom part 11. The fiber containing cavity 6a is defined by the bottom part 11 and the pair of side wall parts 12. The fiber containing cavity 6a is formed with a width gradually increasing toward the opening as shown in FIG. 3. This makes it easier to mount and take out the ribbon fiber stack 8. The bottom part 11 of the chamber element 6 is substantially formed like a planar sheet, having flat outer and inner faces 110, 111. The chamber elements 6 are assembled around the thickening layer 2 in the state where the outer face 110 of the bottom part 11 in each chamber element 6 is in contact with (circumscribes) the outer periphery of the thickening layer 2. Also, each side wall part 12 rises from the bottom part 11 such that its free end portion 12f projects outward.

The side wall part 12 of the chamber element 6 is formed such that its thickness gradually decreases from its base end portion 12b to free end portion 12f. The inner face 121 and outer face 120 of the side wall part 12 are flat slopes. Here, very good results in practice can be obtained when, assuming that the thickness of the free end portion 12f to be $T_{sf}$, and the thickness of the base end portion 12b to be $T_{sb}$, $T_{sf} \leq 0.85 \times T_{sb}$ is satisfied. More preferably, $T_{sf} \leq 0.75 \times T_{sb}$ is satisfied. In this case, in the transverse cross section of the chamber element 6 shown in FIG. 3 by way of example, the thickness $T_{sf}$ of the free end portion 12f and the thickness $T_{sb}$ of the base end portion 12b are defined as follows. First, the thickness $T_{sf}$ of the free end portion 12f is defined as the distance between the inner wall 121 and outer wall 120 of the side wall part 12 on a line separated from a line tangential to the outer face 110 of the bottom part 11 by a distance h which corresponds to 85% of the height H of the chamber element 6. On the other hand, the thickness $T_{sb}$ of the base end portion 12b is defined as the distance between the intersection point K, which is formed between a line tangential to the inner face 111 of the bottom part 11 and a line tangential to the inner face 121 of the side wall part 12, and the outer face 120 of the side wall part 12.

As a result, the moment generated in the side wall part 12 becomes smaller, whereby, when the chamber element 6 is bent in the widthwise direction x of the fiber containing cavity 6a in order to form an S-Z reverse portion Re (see FIG. 2), both side wall parts 12 of the chamber element 6 would lean less toward the fiber containing cavity 6a. Accordingly, the optical cable 1 using such a chamber element 6 can favorably keep transmission characteristics of the ribbon fibers 7 (optical fibers) included in the optical cable 1. Also, the opening of the fiber containing cavity 6a is prevented from being blocked by the side wall parts 12. Consequently, after the optical cable 1 is laid, the ribbon fibers 7 can easily be taken out from the optical fiber 1 so as to branch out. Here, each side wall part 12 may also be formed such that its thickness becomes smaller in a stepwise fashion from the base end portion 12b toward the free end portion 12f. Also, the thickness $T_b$ of the bottom part 11 is greater than the thickness $T_s$ of the side wall part 12. The reason why the thickness $T_b$ of the bottom part 11 is made greater than the thickness $T_s$ of the side wall part 12 will be explained later. The chamber elements 6 may also be assembled around a slotted member in an S-Z strand.

Figure 4:
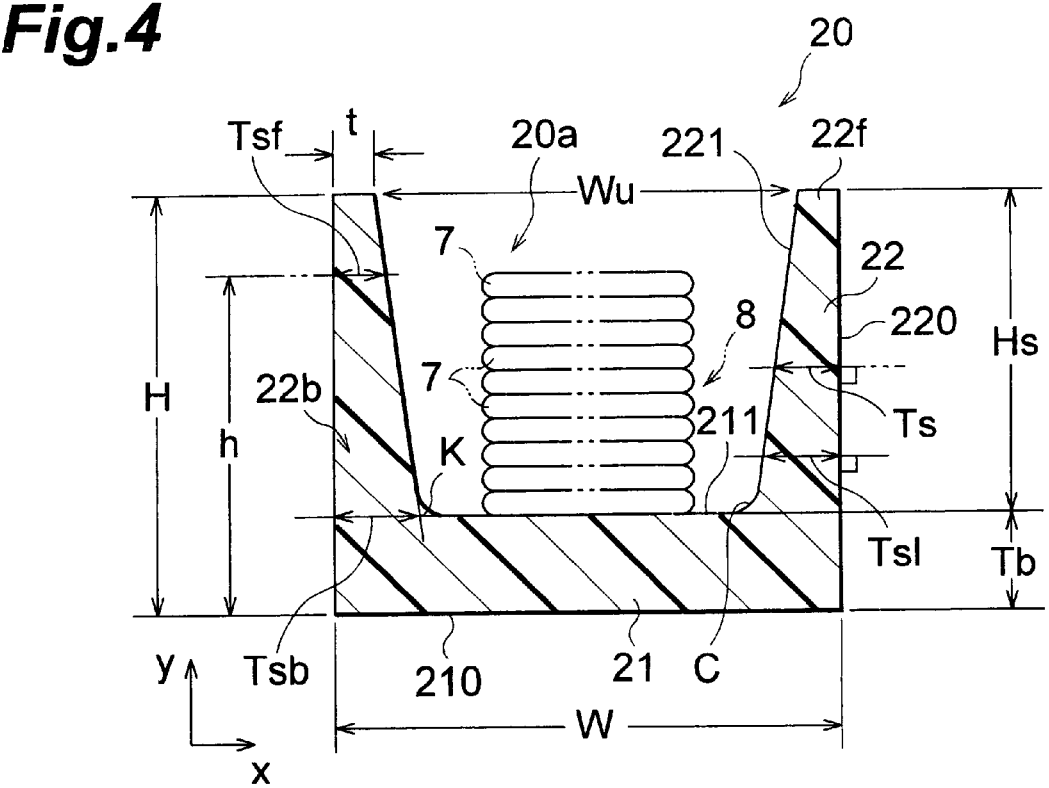
FIG. 4 is a sectional view showing a second embodiment of the optical cable chamber element in accordance with the present invention.

FIG. 4 shows a second embodiment of the chamber element. Depicted chamber element 20 has a fiber containing cavity 20a for containing ribbon fibers 7 (optical fibers) and can be assembled around a central member such as thickening layer, slotted member, or the like in an S-Z strand. The chamber element 20 is made, for example, by extrusion-molding a synthetic resin such as PBT or the like. The chamber element 20 has a bottom part 21 and a pair of right and left side wall parts 22 rising from both ends of the bottom part 21. The fiber containing cavity 20a is defined by the bottom part 21 and the pair of side wall parts 22.

The bottom part 21 of the chamber element 20 is substantially formed like a planar sheet, having flat outer and inner faces 210, 211. The outer face 220 of each side wall part 22 is orthogonal to the outer face 210 of the bottom part 21. The inner face 211 of the side wall part 22 is formed as a flat slope. Namely, each side wall part 22 of the chamber element 20 is formed such that its thickness gradually decreases from its base end portion 22b toward free end portion 22f. As a result, the moment generated in the side wall part 22 becomes smaller. Accordingly, when the chamber element 20 is bent in the widthwise direction x of the fiber containing cavity 20a in order to form an S-Z reverse portion Re (see FIG. 2), both side wall parts 22 of the chamber element 20 would lean less toward the fiber containing cavity 20a. On the other hand, the width of the fiber containing cavity 20a gradually increases toward the opening. Accordingly, it becomes easier to mount and take out the ribbon fiber stack 8.

When designing this chamber element 20, the inventors have elucidated that the side wall parts of a chamber element may lean due to the bending of the bottom part as well. Therefore, when determining the thickness of the bottom part 21, the inventors have taken account of the relationship between the thickness Tb of the bottom part and the thickness $T_s$ of the side wall part 22. As a result of various experiments, it has been found out that the bending in the bottom part 21 can be kept to a minimum when the thickness $T_b$ of the bottom part 21 is made greater than the thickness $T_s$ of the side wall part 22. In particular, results of various experiments have revealed that, in the case where the width W of the bottom part 21 is greater than the height $H_s$ of the side wall part 22, it is very effective even if the thickness $T_b$ of the bottom part 21 is made slightly greater than the thickness $T_s$ of the side wall part 22.

In this case, very good results in practice can be obtained when, assuming the thickness of the bottom part to be $T_b$, and the thickness of the side wall part to be $T_s$, $T_b \geq 1.1 \times T_s$ is satisfied. More preferably, $T_b \geq 1.2 \times T_s$ is satisfied. Here, in the transverse cross section of the chamber element 20 shown in FIG. 4 by way of example, the thickness $T_b$ of the bottom part and the thickness $T_s$ of the side wall part are defined as follows. First, the thickness $T_b$ of the bottom part is defined as the distance between a line tangential to the inner face 211 of the bottom part 21 and a line tangential to the outer face 210 of the bottom part 21. On the other hand, the thickness $T_s$ of the side wall part refers to the distance between the flat inner face 221 above the lower corner portion C and the outer face 220. Specifically, as shown in FIG. 4, $T_s$ refers to the distance between the inner face 221 and the outer face 220 on a line orthogonal to a tangent of the outer face 220.

As in the case of this chamber element 20 in which each side wall part thereof is formed such that its thickness gradually decreases from its base end portion to free end portion, it is sufficient if the thickness $T_{s1}$ at the boundary point between the corner portion C and the flat portion satisfies the above-mentioned relational expression. Also, it has been confirmed that, in the case where each side wall part of the chamber element is formed such that its thickness gradually decreases from its base end portion to free end portion, very good results in practice can be obtained when, assuming the thickness of the bottom part to be $T_b$, and the thickness of the base end portion in the side wall part to be $T_{sb}$, $T_b \geq 1.1 \times T_{sb}$ is satisfied. Further, it has been confirmed more preferable to satisfy $T_b \geq 1.2 \times T_{sb}$. An example of size of the chamber element 20 is such that $T_b$=1.2 mm, $T_{sb}$=1.0 mm, t (thickness of the tip of the side wall part 22)=0.5 mm, $W_u$ (opening width of the fiber containing cavity 20)=4.0 mm, and $H_s$=4.0 mm.

Figure 5:
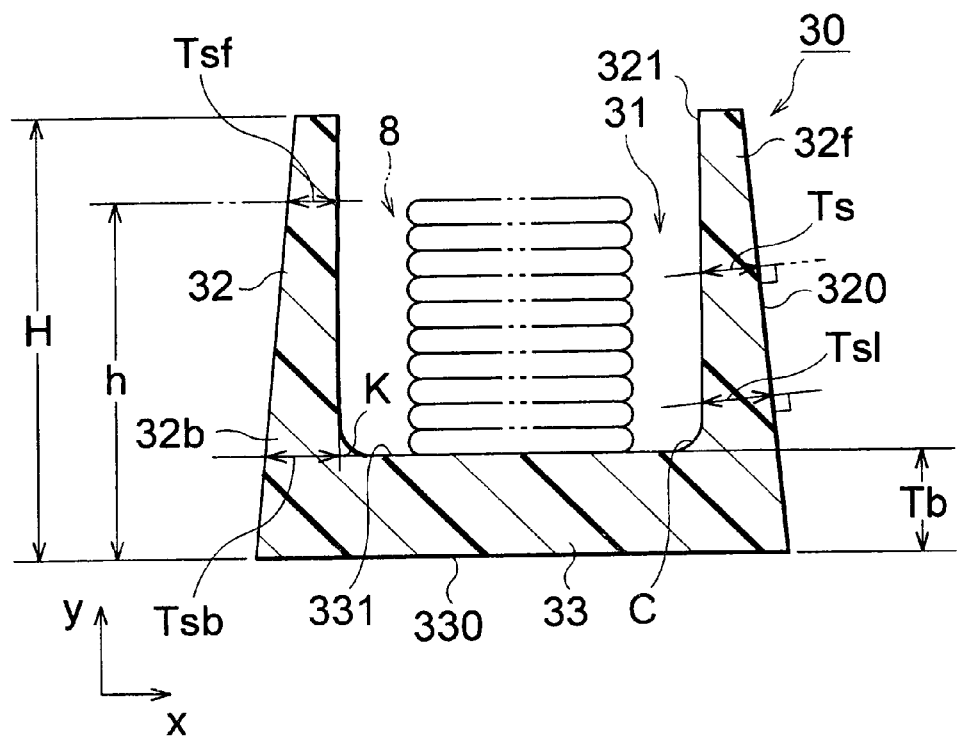
FIG. 5 is a sectional view showing a third embodiment of the optical cable chamber element in accordance with the present invention.
Figure 6:
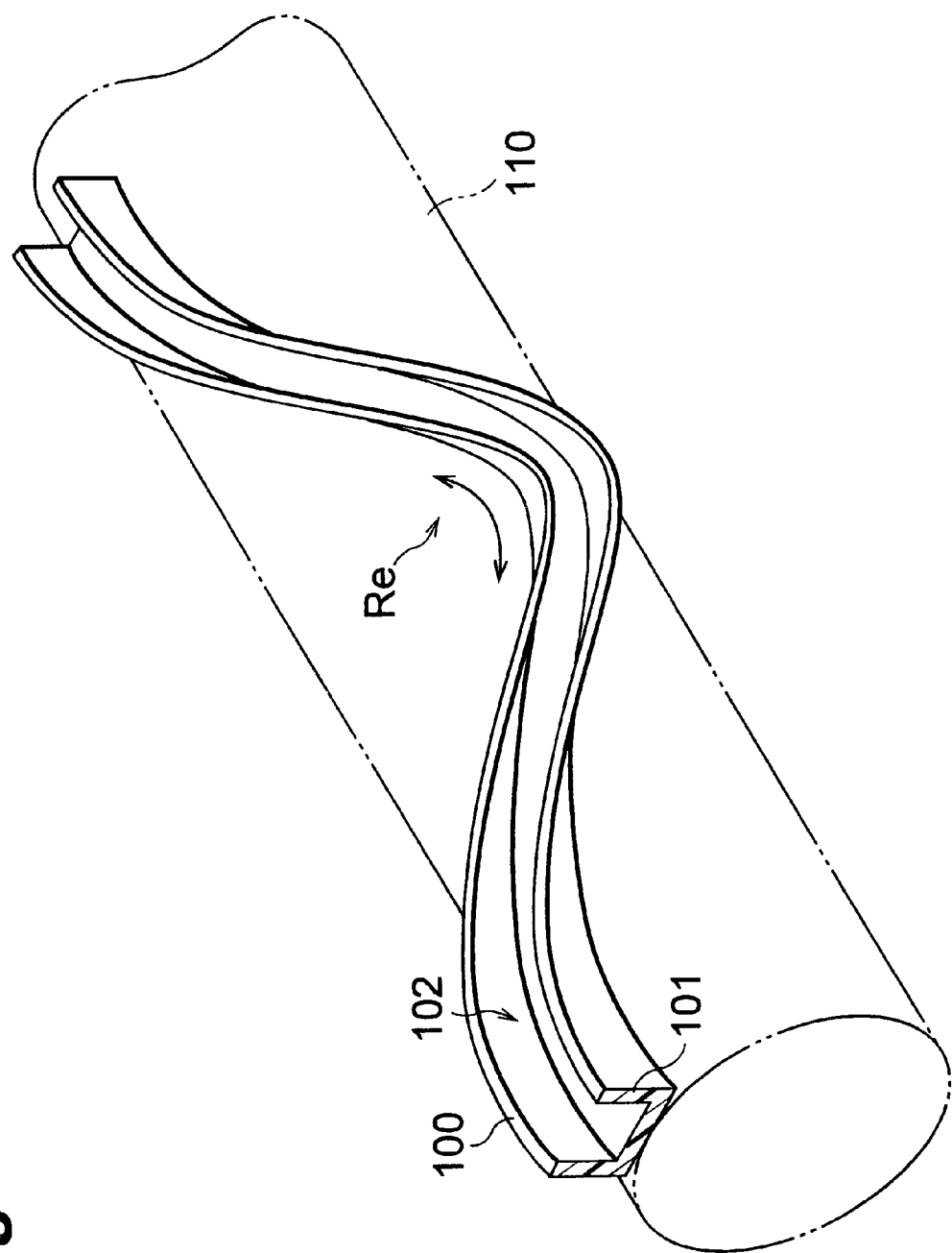
FIG. 6 is a perspective view showing an optical cable chamber element assembled around a central member in an S-Z strand.
Figure 7:
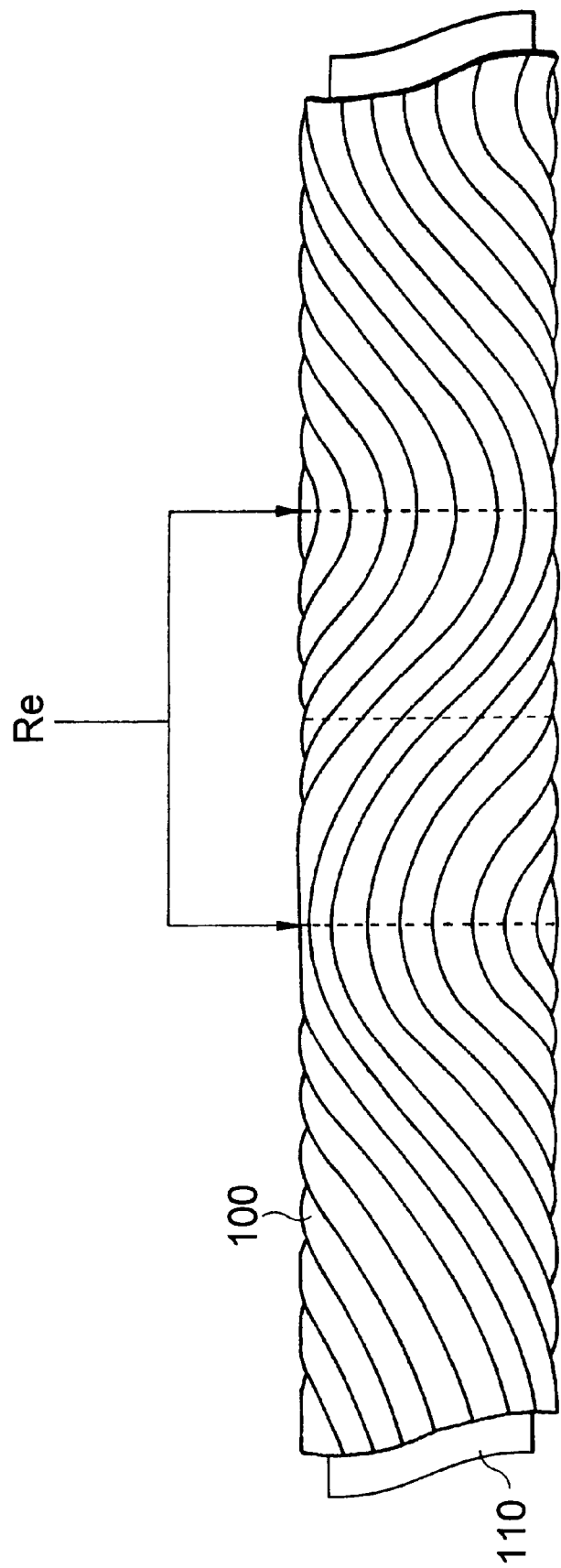
FIG. 7 is a side view showing an optical cable in which chamber elements are assembled around a central member in an S-Z strand.
Figure 8:
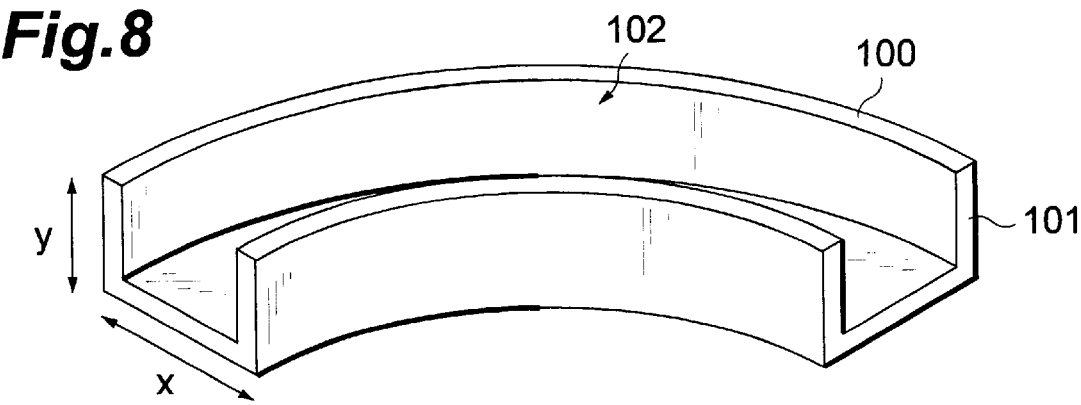
FIG. 8 is a perspective view showing a chamber element bent in the widthwise direction.
Figure 9:
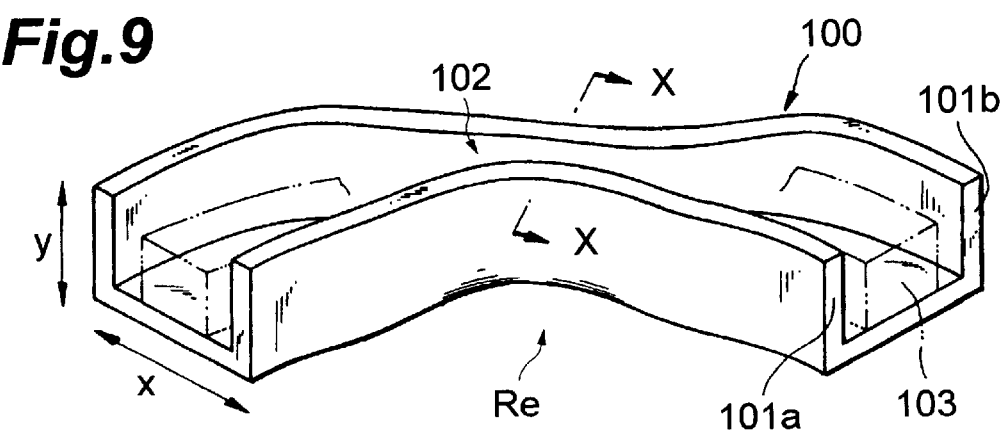
FIG. 9 is a perspective view showing a chamber element in an S-Z reverse portion.
Figure 10:
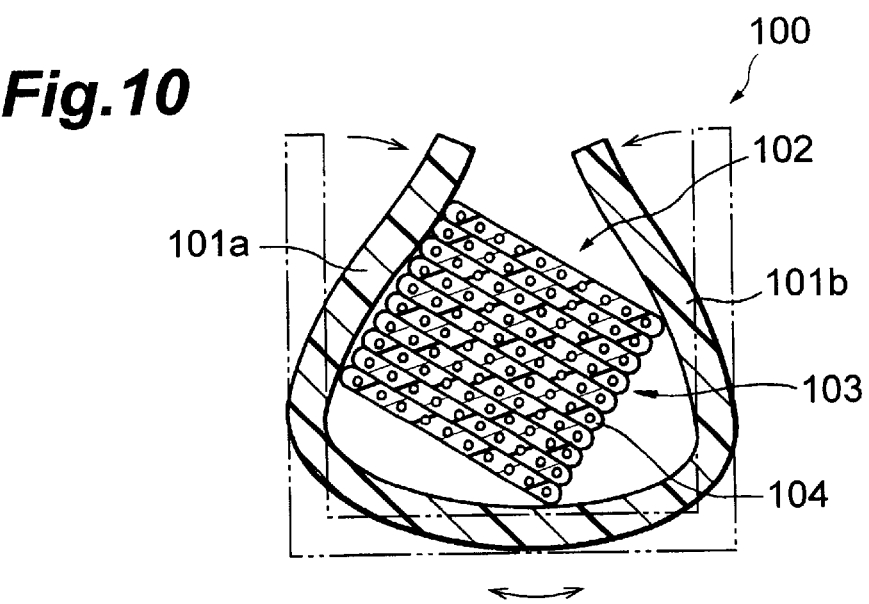
FIG. 10 is a sectional view taken along the line X—X in FIG. 9.

FIG. 5 shows a third embodiment of the chamber element. The chamber element 30 shown in this drawing has a fiber containing cavity 30a for containing a ribbon fiber stack 8 (optical fibers) and can be assembled around a central member such as thickening layer, slotted member, or the like in an S-Z strand. The chamber element 30 is made, for example, by extrusion-molding a synthetic resin such as PBT or the like. In the chamber element 30, the inner face 321 of each side wall part 32 is orthogonal to the inner side wall part 331 of the bottom part 33. By contrast, the outer face 320 of the side wall part 32 is formed as a flat slope.

Namely, each side wall part 32 of the chamber element 30 is formed such that its thickness gradually decreases from its base end portion 32b toward free end portion 32f. As a result, the moment generated in the side wall part 32 becomes smaller. Also, the thickness $T_b$ of the bottom part 33 is greater than the thickness $T_s$ of the side wall part 32. Accordingly, when the chamber element 30 is bent in the widthwise direction x of the fiber containing cavity 31 in order to form an S-Z reverse portion Re (see FIG. 2), both side wall parts 22 of the chamber element 6 would lean less toward the fiber containing cavity 31.

In accordance with the present invention, side wall parts of the chamber element can be prevented from leaning toward the fiber containing cavity, thereby making it possible to realize an optical cable excellent in transmission characteristics and easiness of taking out optical fibers therefrom, and an optical cable chamber element applicable to this optical cable.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical cable having a plurality of optical fibers, said optical cable comprising:
    a central member;
    a plurality of chamber elements each having a bottom part, and a pair of side wall parts rising from said bottom part and defining, together with said bottom part, a fiber containing cavity for containing said optical fiber, each of said side wall parts being formed with a thickness gradually decreasing from a base end portion toward a free end portion; and
    an S-Z stranded part in which said chamber elements containing said optical fibers are assembled around said central member in an S-Z strand.

2. An optical cable according to claim 1, wherein, assuming that the thickness of said free end portion to be $T_{sf}$, and the thickness of said base end portion to be $T_{sb}$, $T_{sf} \leq 0.85 \times T_{sb}$ is satisfied.

3. An optical cable according to claim 1, wherein, assuming that the thickness of said free end portion to be $T_{sf}$, and the thickness of said base end portion to be $T_{sb}$, $T_{sf} \leq 0.75 \times T_{sb}$ is satisfied.

4. An optical cable chamber element adapted to be stranded around a central member of an optical cable, said optical cable chamber element comprising:
    a bottom part, and
    a pair of side wall parts rising from said bottom part and defining, together with said bottom part, a fiber containing cavity for containing said optical fiber,
    each of said side wall parts being formed with a thickness gradually decreasing from a base end portion toward a free end portion.

5. An optical cable chamber element according to claim 4, wherein, assuming that the thickness of said free end portion to be $T_{sf}$, and the thickness of said base end portion to be $T_{sb}$, $T_{sf} \leq 0.85 \times T_{sb}$ is satisfied.

6. An optical cable chamber element according to claim 4, wherein, assuming that the thickness of said free end portion to be $T_{sf}$, and the thickness of said base end portion to be $T_{sb}$, $T_{sf} \leq 0.75 \times T_{sb}$ is satisfied.

* * * * *